United States Patent [19]

Albano et al.

[11] 3,791,862

[45] Feb. 12, 1974

[54] CHEMICAL GROWTH OF INSULATING LAYERS ON GALLIUM ARSENIDE

[75] Inventors: Robert Edmund Albano, Scotch Plains; John Cameron Dyment, Chatham, both of N.J.

[73] Assignee: Bell Telephone Laboratories, Incorporated, Murray Hill, N.J.

[22] Filed: Dec. 22, 1971

[21] Appl. No.: 210,992

Related U.S. Application Data

[63] Continuation-in-part of Ser. No. 156,886, June 25, 1971, abandoned.

[52] U.S. Cl. .................. 117/213, 117/201, 117/118, 148/1.5

[51] Int. Cl. ............................ B44d 1/20, C23b 5/62

[58] Field of Search ...... 117/201, 118, 213; 148/1.5

[56] References Cited

UNITED STATES PATENTS

| | | | |
|---|---|---|---|
| 3,671,313 | 6/1972 | Reynolds | 117/213 |
| 3,623,905 | 11/1971 | Akai | 117/201 |

FOREIGN PATENTS OR APPLICATIONS

| | | | |
|---|---|---|---|
| 753,785 | 2/1967 | Canada | 117/118 |

OTHER PUBLICATIONS

Schwartz, Preliminary Results on the Oxidation of GaAs & GaP during Chemical Etching, J. Electrochemical Society Vol. 118(4) p.657–8(4–1971).

Chem. Abstracts, Schwartz, Vol. 75, (July, 1971) pg. 121705.

*Primary Examiner*—Alfred L. Leavitt
*Assistant Examiner*—M. F. Esposito
*Attorney, Agent, or Firm*—G. S. Indig

[57] ABSTRACT

A process is described for the fabrication of gallium arsenide devices in which insulating layers are chemically grown on gallium arsenide using a pH adjusted peroxide solution as the chemical agent. This procedure has the advantage that it can be carried out at room temperature using fairly simple inexpensive equipment and without introducing additional foreign cations into the process which could contaminate the gallium arsenide.

12 Claims, 3 Drawing Figures

GA AS JUNCTION LASER STRUCTURE

INVENTORS R. E. ALBANO
J. C. DYMENT
BY
ATTORNEY

CHEMICAL GROWTH OF INSULATING LAYERS ON GALLIUM ARSENIDE

CROSS REFERENCE TO RELATED APPLICATIONS

This application is a continuation-in-part of a co-pending application, Ser. No. 156,886, filed June 25, 1971 now abandoned.

BACKGROUND OF THE INVENTION

1. Field of the Invention

The invention relates to the fabrication of gallium arsenide devices. In particular it relates to forming insulating layers on gallium arsenide.

2. Description of the Prior Art

In the fabrication of gallium arsenide devices insulating layers are often required. These insulating layers are used to separate metal electrodes from semiconductor material, as in the fabrication for example of field-effect transistors. Also, these insulating layers may serve to limit the area in which doping species are diffused into the gallium arsenide. This technique is used in the fabrication of diffused junction transistors. Similar insulating layers are used in the fabrication of the stripe geometry junction laser. Other manufacturing techniques used in the fabrication of gallium arsenide devices make use of insulating layers.

Up to the present time the insulating layer used in the fabrication of gallium arsenide devices has usually been $SiO_2$. Two common methods of depositing $SiO_2$ layers are the thermal decomposition of tetraethylorthosilicate at 650° C and the decomposition of silane at 325° C. Although the insulating layers produced by these processes usually have satisfactory characteristics, the process itself has certain economic and procedural limitations. First of all, fairly elaborate equipment is required. This equipment includes gas handling apparatus, pumping stations, heating stations, and usually a means for rotating the gallium arsenide sample. Second, in the case of some gallium arsenide devices, exposure to elevated temperatures is sometimes detrimental to the characteristics of the finished device. Third, the introduction of another non-volatile ion into the gallium arsenide system is potentially detrimental because of its possible doping effect in the semiconductor.

SUMMARY OF THE INVENTION

The invention is a process for the fabrication of gallium arsenide devices in which a pH adjusted hydrogen peroxide solution is used to produce insulating layers. The process applies also to devices using substituted gallium arsenide such as for example gallium aluminum arsenide and gallium indium arsenide. As is well known, aluminum-substituted gallium arsenide crystals have sufficient quality for a variety of device applications for aluminum contents up to $x = 0.7$ in the formula $Ga_{1-x}Al_xAs$ (see H. C. Casey, Jr., and M. B. Panish, *J. Appl. Phys.* 40, 4910 (1969)). Aluminum-substituted gallium arsenide is often used in the active region of a semiconductor laser to alter the frequency of the output radiation (B. I. Miller et al., *Appl. Phys. Lett.*, 18, 403 (1971)). As little as 0.1 percent aluminum substitution yields an observable frequency change. The insulating layers are grown by placing the gallium arsenide material in contact with the pH adjusted peroxide solution. The procedure for growing the insulated layers can be carried out at room temperature. No elaborate equipment is required. Mere exposure of the gallium arsenide surface to the pH adjusted peroxide solution is sufficient. Also, ammonium hydroxide can be used as the pH adjusting agent so that the solution does not contain any non-volatile ions which could potentially become contaminants in the semiconductor. For convenience, the peroxide concentration should be between 5 and 50 weight percent. Below 5 weight percent, the rate of growth of insulation layer becomes inconveniently slow. Above 50 weight percent, the solution becomes unstable. A peroxide concentration between 25 and 35 weight percent is preferred because of commercial availability. The pH of the solution should be between 5 and 10. Below this limit, the rate of growth of the insulating layer becomes inconveniently slow. Above this limit, layer growth is rapid but the layer is not consistently uniform. A pH range between 6.5 and 7.5 is preferred because of the rapid rate at which the insulating layer is formed and the uniformity of the layer. Any pH adjusting agent compatible with aqueous peroxide solution can be used such as an alkali-metal hydroxide. However, ammonium hydroxide is particularly convenient because no foreign metal ions are introduced to the surface of the gallium arsenide and no residue is left on evaporation. This process can be used to fabricate a variety of gallium arsenide devices including stripe geometry junction lasers, field effect transistors, and diffused junction transistors. The layer may also be used for passivation as well as an optical layer.

DETAILED DESCRIPTION

1. Introduction

Figure 1:
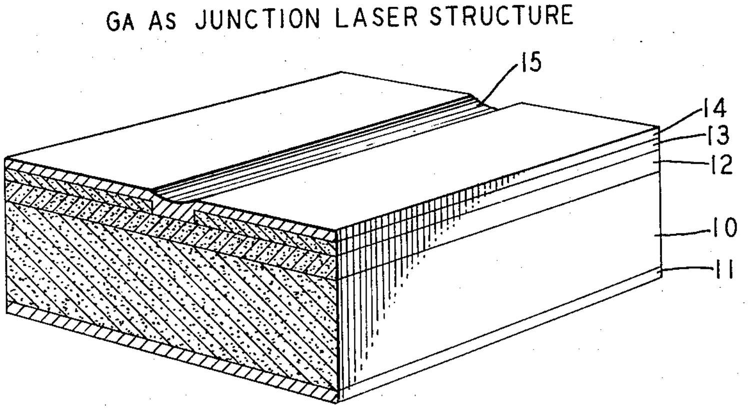
FIG. 1 is a side view of a gallium arsenide stripe geometry junction laser fabricated using the inventive process.

The invention is a process used in the fabrication of gallium arsenide devices and the devices produced by this process. This process involves the use of a pH adjusted peroxide solution in the chemical growth of insulating layers on gallium arsenide. These insulating layers are grown by bringing the surface which is to be insulated in contact with the pH adjusted peroxide solution. The process is conveniently carried out at room temperature but any temperature between the freezing point and boiling point of the peroxide solution yields satisfactory insulating layers. Typically, either the peroxide solution is agitated or the gallium arsenide sample rotated in the solution in order to assure uniform results. However, good layers are grown by merely bringing the gallium arsenide surface in contact with the pH adjusted peroxide solution as, for example, by wetting, spraying, dipping, etc.

Insulating layer formation takes place over a wide range of peroxide concentration. However, solutions with peroxide concentrations greater than 50 percent by weight are unstable and, therefore, inconvenient to use. Below 5 percent by weight peroxide, the rate of formation of the insulating layer is inconveniently slow.

Aqueous peroxide with concentrations between 25–35 percent by weight is commercially available and convenient to use. The pH of the solution should be between 5 and 10. Below this range, the rate of formation of the insulating layer is inconveniently slow. Above this range, the layer formed is sometimes not uniform. A pH between 6.5 and 7.5 is preferred. Any pH adjusting agent compatible with the aqueous peroxide solution may be used. The alkali-metal hydroxides are typical examples. Ammonium hydroxide is a preferred pH adjusting agent since it contains no metal ion which might contaminate the gallium arsenide and leaves no residue on evaporation. Insulating layers generally range in thickness between 500 and 10,000 angstroms. Reaction times generally range from 1 minute to several hours depending on solution pH and concentration and reaction conditions.

2. Evaluation of the Insulating Layers

Several characteristics of insulating layers are desirable in the fabrication of semiconductor devices. For example, good adherence of the insulating layer to the semiconductor material is desirable. The inventive process produces insulating layers which have excellent adherence properties. Also, photoresist materials adhere well to these insulating layers so that standard photolithographic techniques can be used on these surfaces.

Another characteristic of the insulating surfaces produced by the inventive process is the good adherence of such metals as tin and gold to these layers. Thus a thin layer of an active metal such as titanium or chromium need not be evaporated onto the insulating layer before the tin or gold is put on the layer. This simplifies the procedure for fabricating certain gallium arsenide devices. The dielectric breakdown strength is another property of importance in evaluating insulating layers. Measurements on insulating layers produced by the inventive process indicate a breakdown strength of between $10^5$ and $10^6$ volts per cm. For example, the value of $10^6$ volts per cm was found for an insulating layer which was 1,000 angstroms thick and withstood 10 volts prior to breakdown. For a 5,000 angstroms thick layer the breakdown voltage is 50 volts. Such breakdown voltages are sufficient for most semiconductor devices.

3. Semiconductor Devices

The inventive process for producing insulating layers can be used in the fabrication of a large variety of semiconductor devices. These insulating layers are used not only to confine electrical currents to certain regions of a device, but also in diffusion processes in order to prevent diffusion into certain regions of the gallium arsenide material.

The gallium arsenide stripe geometry junction laser is an example of a device where the insulating layer is used to confine electrical current to a certain small region of the semiconductor material. Such a junction laser is shown in FIG. 1. It is made up of N-type gallium arsenide 10 with a metal electrode on the bottom surface 11 and p-type gallium arsenide on the top surface 12. An insulating film 13 made by the inventive process is used to confine the current coming from the top metal electrode 14 to flow only into the p-type gallium arsenide at the restricted stripe contact 15. Such a laser has been produced using the inventive process. These junction lasers emitted laser radiation when pulsed with current densities of about 5,000 amps/cm$^2$ at a temperature of 77° K. Laser frequency can be altered by substitution of aluminum in the gallium arsenide on the top surface 12 (B. I. Miller et al., *Appl. Phys. Lett.*, 18, 403 (1971)). As little as 0.1 percent aluminum yields significant charge in the laser frequency. B. I. Miller et al. operated lasers using $Ga_{1-x}al_xAs$ with $x$ up to 0.21. For some devices which depend on a direct bandgap transition, a theoretical limit occurs at $x = 0.37$ where the crossover between direct and indirect energy gap occurs. (See H. C. Casey, Jr., and M. B. Panish cited above). However, gallium arsenide with higher percentages of aluminum can be used as for example light guiding effects in lasers. At present, gallium aluminum arsenide crystals suitable for device interest can only be obtained for aluminum contents up to 0.7.

Figure 2:
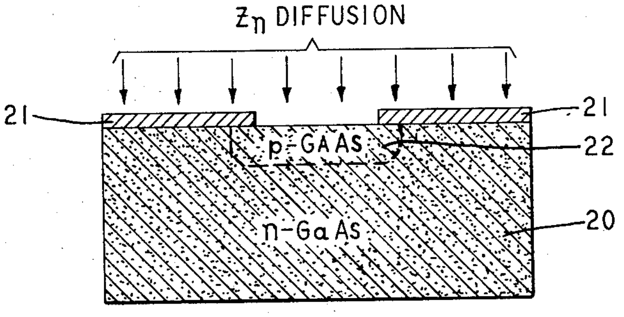
FIG. 2 is a side view of a diffused junction transistor fabricated using the inventive process.

In the fabrication of diffused junction transistors, the insulating layers produced by the inventive process are used as a mask to prevent diffusion into certain areas of the gallium arsenide material. A diffused junction device is shown in FIG. 2. The bulk of the device is made up of n-type gallium arsenide 20. In one step in the fabrication procedure a metal such as zinc is diffused into certain parts of the n-type gallium arsenide 20. In order to prevent diffusion into other parts of the top surface of the n-type gallium arsenide, an insulating layer 21 is put on the surface of the gallium arsenide using the inventive process. The insulating layers are then removed from those parts of the surface where diffusion is desired by for example photolithographic techniques and the diffusion step carried out to produce small regions of p-type gallium arsenide 22.

Figure 3:
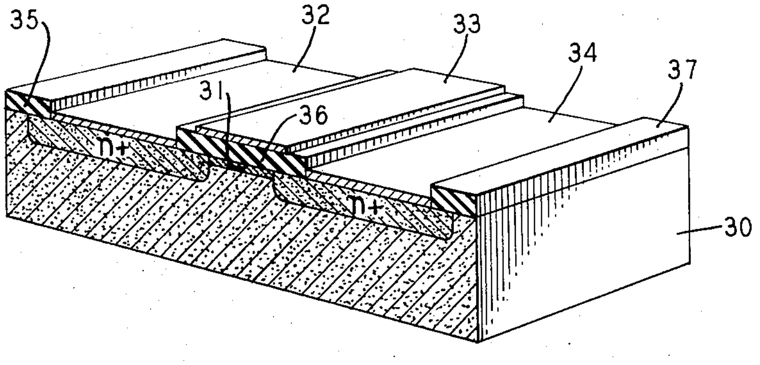
FIG. 3 is a side view of an insulated-gate field-effect transistor fabricated using the inventive process.

FIG. 3 shows a schematic diagram of an insulated gate field-effect transistor. This is made up largely of p-type gallium arsenide 30 with a channel 31, and metal contacts for a source 32, a gate 33 and a drain 34. Important parts of this device are insulating layers 35, 36 and 37 which are produced by the inventive process.

What is claimed is:

1. A process for the fabrication of a device which includes a semiconducting body consisting essentially of $Ga_{1-x}Z_xAs$ with Z selected from the group consisting of Al and In in which the process includes a treatment of at least one surface of the semiconductor body by a procedure comprising the steps of:

a. wetting the surface being prepared with a pH adjusted aqueous solution of a chemical agent;

b. reacting the surface being prepared to form an insulating oxide layer;

characterized in that the aqueous solution consists essentially of between 5 and 50 percent by weight hydrogen peroxide and the pH is between 5 and 10.

2. The process of claim 1 in which the peroxide concentration is between 25 and 35 percent by weight.

3. The process of claim 1 in which the pH is between 6.5 and 7.5.

4. The process of claim 1 in which the pH of the aqueous solution of the chemical agent is adjusted with ammonium hydroxide.

5. The process of claim 1 in which the pH of the aqueous solution of the chemical agent is adjusted with an alkali-metal hydroxide.

6. The process of claim 1 in which the gallium arsenide device is a laser.

7. The process of claim 1 in which the gallium arsenide device is a diffused junction.

8. The process of claim 1 in which the gallium arsenide device is a field-effect transistor.

9. The process of claim 1 in which the said treatment includes exposure of the surface to chemical reactants after formation of the insulating oxide layer.

10. The process of claim 1 in which Z is Al with a concentration range from $x = 0.001$ to $x = 0.7$.

11. The process of claim 1 in which the semiconductor body consists essentially of gallium arsenide.

12. The process of claim 1 in which the insulating oxide layer is at least 500 Angstroms thick.

* * * * *